United States Patent
Whitner et al.

(10) Patent No.: US 10,521,324 B2
(45) Date of Patent: Dec. 31, 2019

(54) PROGRAMMATICALLY CLASSIFYING ALARMS FROM DISTRIBUTED APPLICATIONS

(71) Applicant: CA, Inc., Islandia, NY (US)

(72) Inventors: Richard Whitner, Islandia, NY (US); Ben Nelson, Islandia, NY (US)

(73) Assignee: CA, Inc., Islandia, NY (US)

( * ) Notice: Subject to any disclaimer, the term of this patent is extended or adjusted under 35 U.S.C. 154(b) by 348 days.

(21) Appl. No.: 15/435,429

(22) Filed: Feb. 17, 2017

(65) Prior Publication Data

US 2018/0239658 A1    Aug. 23, 2018

(51) Int. Cl.
    *G06F 11/34*    (2006.01)
    *G06F 11/07*    (2006.01)
    *G06F 11/00*    (2006.01)

(52) U.S. Cl.
    CPC ........ *G06F 11/3409* (2013.01); *G06F 11/004* (2013.01); *G06F 11/0709* (2013.01); *G06F 2201/86* (2013.01)

(58) Field of Classification Search
    CPC ............... G06F 11/004; G06F 11/0709; G06F 11/3006; G06F 11/3476
    See application file for complete search history.

(56) References Cited

U.S. PATENT DOCUMENTS

| | | | |
|---|---|---|---|
| 10,055,262 B1* | 8/2018 | Thomas | G06F 9/5083 |
| 2008/0298229 A1 | 12/2008 | Ballantyne et al. | |
| 2009/0070880 A1 | 3/2009 | Harris et al. | |
| 2009/0125473 A1 | 5/2009 | Amini et al. | |
| 2015/0254969 A1 | 9/2015 | Bishop et al. | |
| 2017/0293515 A1* | 10/2017 | Brew | G06F 11/0781 |

OTHER PUBLICATIONS

'Complex event processing', Wikipedia, http://web.archive.org/web/20161124055141/https://en.wikipedia.org/wiki/Complex_event_processing, Nov. 24, 2016, pp. 1 to 6.

'Introducing Complex Event Processing (CEP) with Apache Flink', http://web.archive.org/web/20160907214614/http://flink.apache.org/news/2016/04/06/cep-monitoring.html, Sep. 7, 2016, pp. 1 to 4.

(Continued)

*Primary Examiner* — Jigar P Patel
(74) *Attorney, Agent, or Firm* — Pillsbury Winthrop Shaw Pittman, LLP

(57) ABSTRACT

Provided is a process including: receiving a given alarm from a given instance of a given service executing on a given computing device, wherein: the given service is one of a plurality of different services that form at least part of a given distributed application, and the distributed application is executing on a plurality of different computing devices including the given computing device; accessing contextual data, the contextual data including metrics or events received from other instances of the given service or other services of the given distributed application; determining an alarm score for the given alarm based on the contextual data, the alarm score being indicative of a marginal effect of the given alarm on performance of the given distributed application; and storing the alarm score in memory in association with the given alarm.

20 Claims, 6 Drawing Sheets

(56) References Cited

OTHER PUBLICATIONS

'Complex Event Processing', http://web.archive.org/web/20161116235313/http://www.tibco.com/products/event-processing/complex-event-processing#close, Nov. 16, 2016, pp. 1 to 3.
'Design Patterns for Complex Event Processing', http://debs08.dis.uniroma1.it/pdf/fa-paschke.pdf, Jun. 23, 2008, pp. 1 to 2.
'CA Spectrum—Event Configuration User Guide', hhttps://support.ca.com/cadocs/0/CA%20Spectrum%209%203%200-ENU/Bookshelf_Files/PDF/Spectrum_Event_Configuration_User_ENU.pdf, May 2013, pp. 1 to 157.
'PATROL and ProactiveNet Performance Management (BPPM)', http://web.archive.org/web/20170131235607/http://www.bmc.com/it-solutions/brands/patrol-proactivenet.html, Jan. 31, 2017, pp. 1 to 4.
'Monitoring Your Auto Scaling Groups and Instances Using Amazon CloudWatch', http://web.archive.org/web/20161114171915/http://docs.aws.amazon.com/autoscaling/latest/userguide/as-instance-monitoring.html, Nov. 11, 2016, pp. 1 to 7.
'CA Unified Infrastructure Management', http://web.archive.org/web/20170217195341/https://www.ca.com/us/products/ca-unified-infrastructure-management.html, Feb. 17, 2017, pp. 1 to 17.
'CA Application Delivery Analysis', http://web.archive.org/web/20160906212544/http://www.ca.com/us/products/ca-application-delivery-analysis.html, Sep. 6, 2016, pp. 1 to 6.
'Application Performance Monitoring & Management', http://web.archive.org/web/20170130001002/https://www.ca.com/us/products/application-performance-monitoring.html, Jan. 30, 2017, pp. 1 to 8.

\* cited by examiner

PROGRAMMATICALLY CLASSIFYING ALARMS FROM DISTRIBUTED APPLICATIONS

BACKGROUND

1. Field

The present disclosure relates generally to distributed computing and, more specifically, to programmatically classifying alarms from distributed applications.

2. Description of the Related Art

Distributed applications are computer applications implemented across multiple computers. The group of computers generally each execute at least part of the application's code and cooperate to provide the functionality of the application. Examples include client-server architectures, in which a client computer cooperates with a server to provide functionality to a user. Another example is an application having components replicated on multiple computers behind a load balancer to provide functionality at larger scales than a single computer. Some examples have different components on different computers that execute different aspects of the application, such as a database management system, a storage area network, a web server, an application program interface server, and a content management engine.

These applications can be characterized as a service composed of a variety of other services, which may themselves be composed of other services. Examples of a service include a component (e.g., one or more executing bodies of code) that communicates via a network (or loopback network address) with another component, often by monitoring a port of a network address of the computer upon which the service executes. Services composed of other services generally form a service hierarchy (e.g., a service tree) that terminates in leaf nodes composed of computing hardware each executing a given low level service. In some cases, a given node of this tree may be present in multiple trees for multiple root services.

As distributed applications have grown more complex in recent years, and the scale of computing loads has grown, many distributed applications have been designed (or redesigned) to use more, and more diverse, services. Functionality that might have previously been implemented within a single thread on a single computing device (e.g., as different sub-routines in a given executable) has been broken-up into distinct services that communicate via a network interface, rather than by function calls within a given thread. Services in relatively granular architectures are sometimes referred to as a "microservice." These microservice architectures afford a number of benefits, including ease of scaling to larger systems by instantiating new components, making it easier for developers to reason about complex systems, and increased reuse of code across applications.

However, microservice architectures, and relatively complex distributed applications generally, give rise to a number of challenges for developers and operations engineers. These services, up and down the service tree, often emit various alarms and other metrics, e.g., central processing unit (CPU) usage threshold exceeded, latency threshold exceeded, buffer/queue size threshold exceeded, thrown software errors, etc. The rate with which this data is emitted from more complex architectures can overwhelm existing techniques. Existing tools are generally not capable of adequately assessing the severity of these alarms or taking responsive action.

SUMMARY

The following is a non-exhaustive listing of some aspects of the present techniques. These and other aspects are described in the following disclosure.

Some aspects include a process including: receiving a given alarm from a given instance of a given service executing on a given computing device, wherein: the given service is one of a plurality of different services that form at least part of a given distributed application, and the distributed application is executing on a plurality of different computing devices including the given computing device; accessing contextual data, the contextual data including metrics or events received from other instances of the given service or other services of the given distributed application; determining an alarm score for the given alarm based on the contextual data, the alarm score being indicative of a marginal effect of the given alarm on performance of the given distributed application; and storing the alarm score in memory in association with the given alarm.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
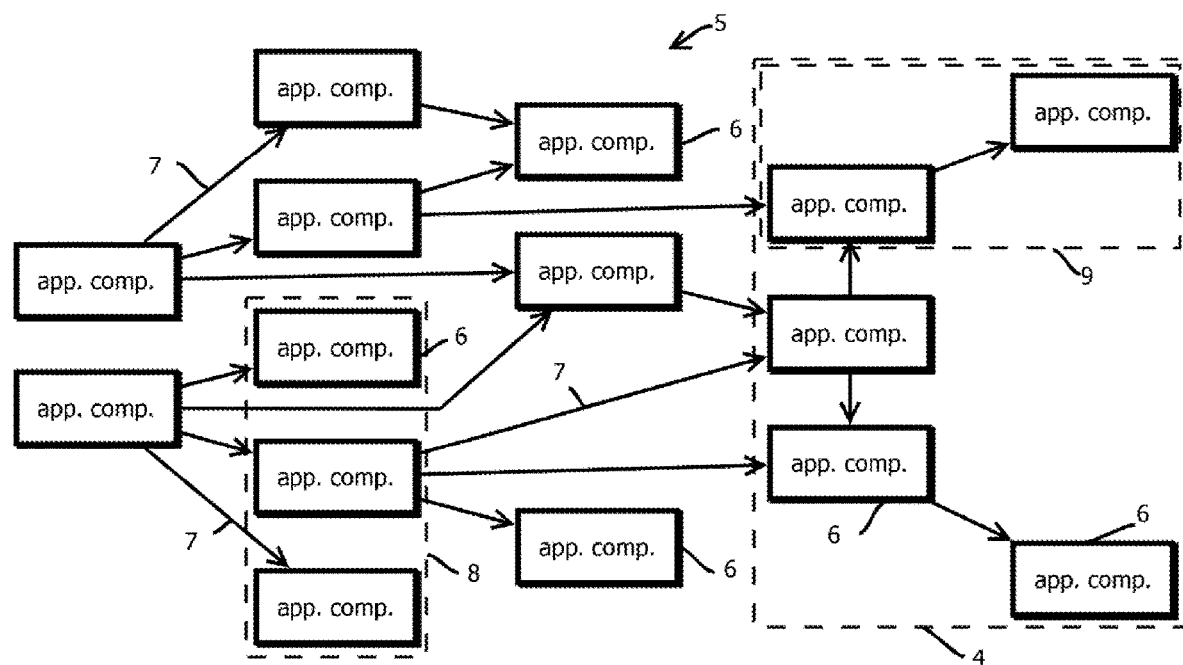
FIG. 1 is a block diagram of an example of a logical architecture of a distributed application that may be monitored in accordance with embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of application and infrastructure monitoring. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Assessing the seriousness of the marginal alarm for a given service, and particularly services higher in a service tree, can be difficult. Often a given service is one of several instances of the service that provide redundancy, and usage of those redundant services varies. Thus, an alarm that a given service is nearing some threshold that could impair performance might be very serious if that is the only remaining instance of the service or the other instances have little remaining capacity. On the other hand, the same scenario may not be particularly concerning where there is substantial redundancy and capacity. Further, there may be interactions between heterogenous portions of the service tree, e.g., in a pipeline of a service, latency from one service may consume a latency budget to the point that relatively small delays from other services are of greater concern.

These and other issues may be mitigated by techniques exemplified below. It should be emphasized that some embodiments may implement only a subset of these techniques, as they are independently useful, or they may be used together. For instance, a technique for scoring alarms described with reference to FIGS. 1-3 may be implemented independently of a technique to manage alarms described with reference to FIGS. 4-5 below, and vice versa, or they may be combined. For instance, alarms may be managed based on alarm scores.

In some embodiments, an aggregate score provides a more holistic measure of the marginal effect of an alarm given a current state of a larger part (and in some cases the whole) service tree. In some embodiments, services are grouped according to whether the services offer redundant capacity (e.g., a set of instances of a microservice behind a load balancer can constitute a group). Within a group, when an alarm is received, a score may be calculated for the alarm based on an amount of remaining capacity within the group. In some cases, the score is a nominal score: e.g., if a system has three servers serving up a database management system, and the system is in a situation where none of these servers are available, an alarm indicating the failure of the last server may be designed as "critical," an alarm when one is remaining may be designated as "major," and an alarm when two are remaining may be designated as "minor," etc. In other cases, the score may be weighted combination of various states, e.g., an aggregate measure of the health of each remaining functional member of the group. Similar techniques may be applied along a pipeline with respect to latency, e.g., if two of three stages of a pipeline are already running relatively slow, an alarm in the third stage may result in an elevated score. In some cases, the score is calculated across multiple nested groups to assess the marginal effect of an alarm at various levels of the service tree. Some embodiments may execute a rules engine that attaches various actions (e.g., alarm, email, text message, spin up another instance, etc.) to various results of the aggregate scores. In some cases, weights and rules by which alarms are aggregated across a group may be tunable by users or learned based on a training set of logged historical alarms, consequences, and responsive actions.

In some cases, the number of alarms (and amount of processing thereon) is relatively fast compared to the processing capabilities of many computers, e.g., thousands of alarms per second. To reach this scale, some embodiments may batch alarms and operate upon the batch. In some cases, outbound messages within a batch may be consolidated. In some cases, batches are processed with in-memory storage with persistent cache to operate faster than systems that read from disk. In some cases, the batched alarm messages are processed concurrently in multiple threads. In some cases, a state of a group is held in cache as reference data, so that when an alarm is received, the reference data in cache can be accessed to calculate an aggregate score for the group. The reference data may be expired from cache by sending a message like an alarm. Or other embodiments may implement other designs, some of which do not provide all of these benefits, which is not to suggest that other features may not also be varied.

The present techniques are better understood with an appreciation for the complexity of modern distributed applications. FIG. 1 shows an example logical architecture of a distributed application 5. This logical architecture is a relatively simple example used to illustrate the present techniques, so it should be appreciated that commercial embodiments are likely to process information related to substantially more complex distributed applications than that shown in FIG. 1.

In this example, the distributed application 5 includes 6 application components, but embodiments are expected to process monitoring information from distributed applications including substantially more application components, for example, exceeding 50, 100, and in some cases, 1000 different application components. In some cases, some of the application components are duplicate instances that operate concurrently, for instance, behind load balancers, to service transactions at larger scales. In some cases, there may be more than 50, 100, or 1000 different types of application components, with more than two, more than five, or more than 50 different instances of some of the different types.

In some embodiments, the distributed application 5 is partially or entirely implemented with a service-oriented architecture in which the different application components 6 are different instances of various services. In some cases, the services may be characterized as "microservices," a term used to refer to services in a relatively granular architecture in which the functionality of the distributed application is divided into a relatively large number of different services each having a relatively focused functionality. It is expected that industry will move towards increased use of microservices in the future, which is expected to make the above-describe problems even more acute.

Each service is a different program or instance of a program executing on one or more computing devices. Thus, unlike different methods or subroutines within a program, the services in some cases do not communicate with one another through shared program state in a region of memory assigned to the program by an operating system on a single computer and shared by the different methods or subroutines. Rather, the different services may communicate with one another through network interfaces, for instance, by messaging one another with application program interface (API) commands (having in some cases parameters applicable to the commands) sent to ports and network addresses associated with the respective services (or intervening load balancers). In some cases, each port and network address pair refers to a different host, such as a different computing device, from that of a calling service. In some cases, the network address is a loopback address referring to the same computing device. Interfacing between services through network addresses, rather than through shared program state, is expected to facilitate scaling of the distributed application 5 through the addition of more computing systems and redundant computing resources behind load balancers. In contrast, often a single computing device is less amenable to such scaling as hardware constraints on even relatively high-end computers can begin to impose limits on scaling relative to what can be achieved through distributed applications.

In some cases, each of the services may include a server (e.g., an executed process) that monitors a network address and port associated with the service (e.g., an instance of a service with a plurality of instances that provide redundant capacity). In some embodiments, the server (e.g., a server process executing on the computing device) may receive messages, parse the messages for commands and parameters, and call appropriate routines to service the command based on the parameters. In some embodiments, some of the servers may select a routine based on the command and call that routine.

In some cases, the distributed application 5 may be characterized with a logical architecture topology like that shown in FIG. 1, which may indicate which application components call which other application components, as indicated by links 7 in the illustrated logical architecture topology. Further, in some cases, the logical-architecture topology may indicate groups of application components, such as group 8, that provide redundant capacity. In some cases, each application components 6 within group 8 may be a duplicate instance of the same service (which is not to imply that program state is identical at any given moment in time or that the instances are not configured differently, for instance, with different network addresses). In some cases, each application component in group 8 may provide the same service to calling application components. One group 8 of multiple instances of the same service is shown, but it commercial embodiments are expected to include many such groups, often with substantially more instances in each group. Often, to operate at commercially relevant scales, with acceptable uptimes, and acceptable latency, distributed applications include redundancy at all or nearly all services, as loads placed on the distributed application can fluctuate with time and individual computing devices and application components are expected to fail from time to time.

Further, in some cases, application components may be nested, as indicated by an application component 9 that includes two lower-level application components. Often, services are made up of other services, which may themselves be made from other services. In some cases, a given service may be part of multiple other services. Further, in some cases, a given service may be part of multiple distributed applications. In some embodiments, a hierarchy of services may be characterized by a service tree in which higher-levels in the tree call lower-levels in the tree in order to provide their respective service. In some cases, the service tree may include two, three, five, ten, or more different layers of hierarchy. For example, FIG. 1 shows another service 4 that includes service 9 along with several other application components 6 each providing a service, some of which are accessed directly by some other application components without a call to service 4.

The distributed application 5 may be any of a variety of different types of distributed applications, in some cases implemented in one or more data centers. In some cases, the distributed application is a software-as-a-service SaaS application, for instance, accessed via a client-side web browser or via an API. Examples include web-based email, cloud-based office productivity applications, hosted enterprise resource management applications, hosted customer relationship management applications, document management applications, human resources applications, Web services, server-side services for mobile native applications, cloud-based gaming applications, content distribution systems, and the like. In some cases, the illustrated distributed application 5 interfaces with client-side applications, like web browsers via the public Internet, and the distributed application 5 communicates internally via a private network, like a local area network, or via encrypted communication through the public Internet.

As discussed, distributed applications are often relatively complex and difficult for developers and operations engineers to reason about. To help make these applications more manageable, often monitoring applications are installed alongside the distributed application to gather information about the underlying computers upon which the distributed application is executing and performance of application components. However, as discussed above, alarms or other events reported by these monitoring applications can be difficult to analyze, as the number and rate of events is often relatively large. As a result, it can be difficult to assess the marginal effect of a given event on the operation of a distributed application.

Figure 2:
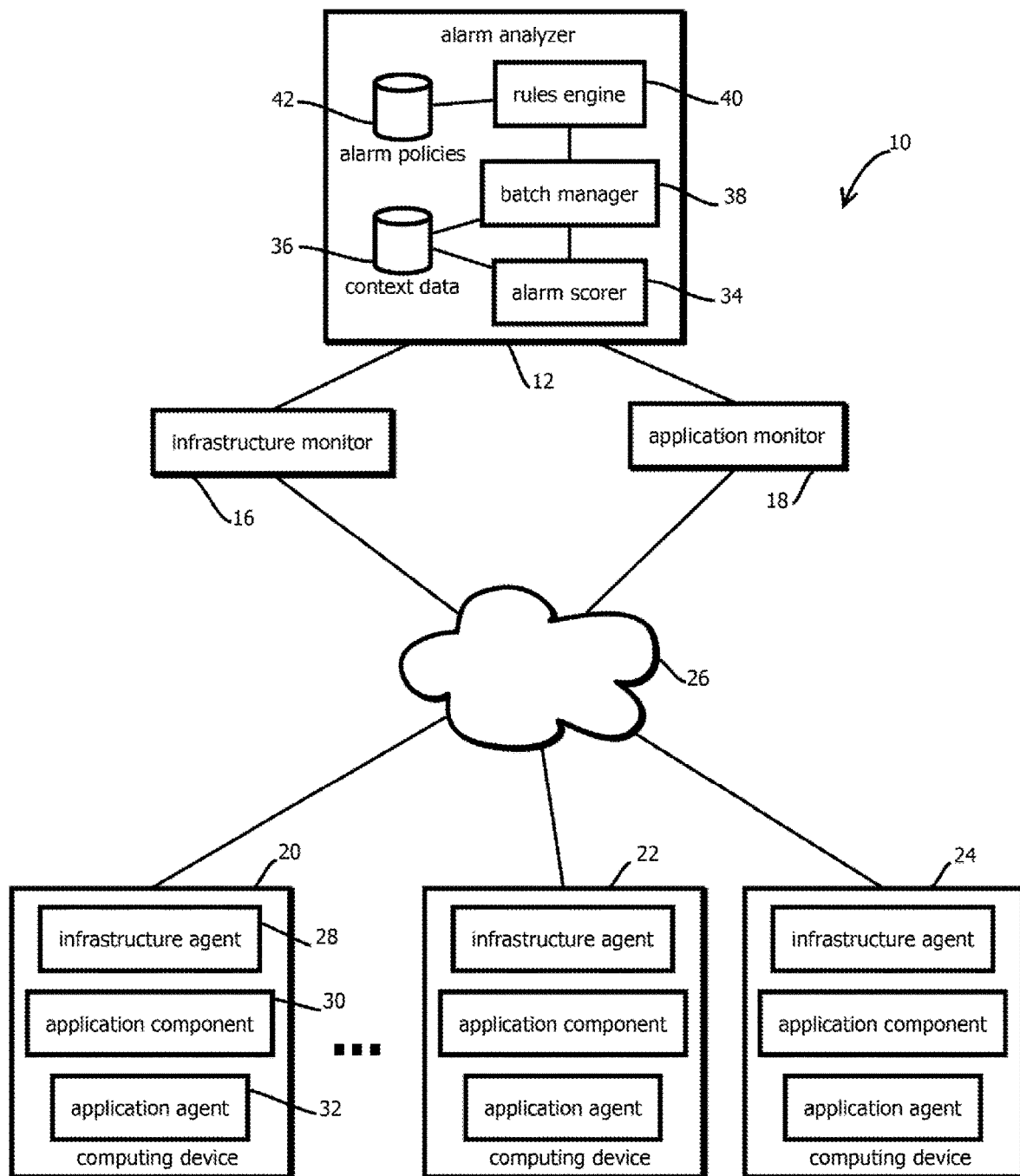
FIG. 2 is a block diagram of a computing environment having an alarm analyzer configured to score alarms in accordance with embodiments of the present techniques.

FIG. 2 shows an example of a computing environment 10 with an alarm analyzer 12 expected to mitigate this problem or address other problems discussed below or that will be apparent to a reader of ordinary skill in the art. In some embodiments, the alarm analyzer 12 is operative to receive alarms from one or more different types of monitors of a distributed application and calculate one or more scores for the received alarms that indicate the (actual or probable with greater than a threshold probability) marginal effect of the alarm given a current state of the distributed application, for instance, given other events or metrics pertaining to other portions of the distributed application. To this end, in some embodiments, the alarm analyzer 12 is configured to execute a process described below with reference to FIG. 3. In some embodiments, the components of the system of FIG. 2 may be implemented with a plurality of the computing devices described below with reference to FIG. 6, for instance, with rack-mounted computing devices in a data center or a plurality of data centers configured to communicate with one another via various networks, such as local area networks and the Internet. In some cases, the monitoring application may route communicate via a different network than that of the distributed application. For instance, the monitoring application may communicate via an out-of-band network in a data center, while the distributed application may communicate via an in-band network. Out-of-band communications are expected to reduce an attack surface of the distributed application by maintaining at least some interfaces of the monitoring application on a network that is not exposed to the public Internet. Or in some cases, these communications may be consolidated on a single network, for instance to simplify the physical architecture.

The operation of the alarm analyzer 12 is best understood in view of the computing environment 10 in which it operates. In some embodiments, the computing environment 10 is a distributed computing environment including a relatively large number of computing devices, for instance, deployed over several data centers or enterprise local area networks. In many cases, the number of computing devices with which the computing environment 10 is implemented is expected to exceed 10, and in many commercially relevant use cases, 100, or 1000.

In this example, the computing environment 10 includes an alarm analyzer 12, an infrastructure monitor 16, an application monitor 18, a plurality of monitored computing devices 20, 22, and 24 executing a monitored distributed application, and a network 26, such as the Internet or various other intermediary networks, like local area networks.

Three computing devices 20, 22, and 24 are shown, but embodiments are expected to typically include many more, for instance, numbering in the dozens, hundreds, or thousands or more. In some embodiments, the computing devices 20, 22, and 24 may be rack-mounted computing devices in a data center, for instance, in a public or private cloud data center. In some embodiments, the computing devices 20, 22, and 24 may be geographically remote from one another, for instance, in different data centers, and geographically remote from the other components 12, 16, and 18, or these components may be collocated.

In some embodiments, the network 26 includes the public Internet and a plurality of different local area networks, for instance, each within a different respective data center connecting to a plurality of the computing devices 20 through 24. In some cases, the various components may connect to one another through the public Internet via an encrypted channel. In some cases, a data center may include an in-band network through which the data operated upon by the application is exchanged and an out-of-band network through which infrastructure monitoring data is exchanged. Or some embodiments may consolidate these networks.

In some embodiments, each of the computing devices 20 through 24 may execute a variety of different routines specified by installed software, which may include application software, monitoring software, and an operating system. Application software, in this context, serves a different purpose from monitoring software. The application software generally executes in service of a business function or other workload for which the computing environment 10 was provisioned by a user. In contrast, the monitoring software monitors, and in some cases manages, the operation of the application software or the computing devices upon which the application software is executed. Thus, the application software does not require the monitoring software to serve its purpose, but with the complexity of modern application software and infrastructure, often the monitoring software makes deployments much more manageable and easy to improve upon.

In some cases, the application software is a distributed application, meaning that different components of the application software execute on different hosts, for instance, on different computing devices, in different virtual machines, in different containers, or in different operating systems having different memory address spaces. In some embodiments, each computing device may have a single host, or a given computing device may have multiple hosts, for instance, in the case of a computing device executing multiple virtual machines, each having a virtual machine operating system and executing within an operating system of the computing device. In some cases, each host may have a different network layer host address. A "host" need not be labeled as a host in program code or data structures to constitute a host, e.g., often hosts may be labeled as "servers" or "guests."

In many cases, the application software is implemented with different application components 30 executing on the different hosts. In some cases, the different application components may communicate with one another via network messaging, for instance, via a local area network, the Internet, or a loopback network address on a given computing device. In some embodiments, the application components communicate with one another via respective application program interfaces, such as representational state transfer (REST) interfaces, for instance, in a microservices architecture. In some embodiments, each application component includes a plurality of routines, for instance, functions, methods, executables, or the like, in some cases configured to call one another. In some cases, the application components are configured to call other application components executing on other hosts, such as on other computing devices, for instance, with application program interface request including a command and parameters of the command. In some cases, some of the application components 30 may be identical to other application components on other hosts, for instance, those provided for load balancing purposes in order to concurrently service transactions. In some cases, some of the application components may be distinct from one another and serve different purposes, for instance, in different stages of a pipeline in which a transaction is processed by the distributed application. An example includes a web server that receives a request, a controller that composes a query to a database based on the request, a database that services the query and provides a query result, and a view generator that composes instructions for a web browser to render a display responsive to the request to the web server. Often, pipelines in commercial implementations are substantially more complex, for instance, including more than 10 or more than 20 stages, often with load-balancing at the various stages including more than 5 or more than 10 instances configured to service transactions at any given stage. Or some embodiments have a hub-and-spoke architecture, rather than a pipeline, or a combination thereof. In some cases, multiple software applications may be distributed across the same collection of computing devices, in some cases sharing some of the same instances of application components, and in some cases having distinct application components that are unshared.

With the complexity that can arise in distributed applications, it can be difficult to diagnose application performance issues or infrastructure issues. Accordingly, some embodiments include monitoring software. The monitoring software is of two distinct types that, while they both perform monitoring, perform functions recognized as in industry as being in distinct product categories traditionally: infrastructure monitoring, and application performance monitoring. The former can be analogized to the diagnostic software used by an automotive mechanic to monitor a car's engine, while the latter can be analogized to GPS navigation software by which a car's direction and speed is tracked. Both relate to the operation of the car, but they are distinct categories of software. A similar relationship exists for application performance monitoring and infrastructure monitoring applications.

In some embodiments, the infrastructure monitoring software may be a distributed infrastructure management application that includes the infrastructure monitor 16 and infrastructure agents 28 installed on the computing devices 20 through 24. In some embodiments, the infrastructure agent may be installed on networking equipment as well, for instance, on switches and routers. Or some embodiments are partially or entirely agentless, and metrics, events, and attributes may be gathered with the various protocols described below for this purpose.

In some embodiments, the infrastructure agent is configured to gather attributes of the computing host upon which the infrastructure agent executes, such as a host name (or other type of host identifier), a network address, a medium access control address, a domain name service, a data center identifier, a data center region, a processor model, a processor speed, amounts of processor memory of various types of cache (e.g. L1 and L2), an operating system name, an operating system version, operating system configurations, firmware names, firmware versions, driver names, driver versions, installed application names, installed application versions, amounts of memory available in random access memory, memory speed, amounts of persistent storage available, persistent storage speed, and the like. In some embodiments, the infrastructure agent is configured to gather metrics of the host upon which the infrastructure agent executes, for instance, processor utilization, memory utilization, temperature, network bandwidth, network latency, rates of packet loss on networks, and the like. In some embodiments, the infrastructure agent is configured to gather events, such as alarms, indicative of occurrences at the host upon which the infrastructure agent executes, for instance, instances of the above metrics crossing (or changing faster than) a threshold, operating system errors, crashes, reboots, corrupted memory being detected, and the like.

In some embodiments, the infrastructure agent may be configured to report such gathered information to the infrastructure monitor 16, for instance, periodically, and buffer the information between reports. In some embodiments, the infrastructure agent may be configured to receive requests for such information from the infrastructure monitor 16 and respond with responsive information, for instance, all information buffered, or information responsive to a query from the infrastructure monitor 16.

In some embodiments, the infrastructure agent 28 may include a plurality of "probes," which may be routines configured to gather information pertaining to a particular use case for the host, for example, probes configured to gather information about databases, email servers, web servers, and the like. In some embodiments, some infrastructure agents may have a plurality of probes and different infrastructure agents may have different pluralities of probes. Or in other architectures consistent with the present techniques, each "probe" may be characterized as an agent, e.g., a single host may have multiple specialized infrastructure or application performance monitoring agents.

In some use cases, system administrators do not have a way to easily take inventory of the computing devices upon which a given distributed application or plurality of distributed applications execute. Often computing devices or hosts executing thereon, are added and removed relatively frequently, often over diverse geographic areas, in some cases automatically responsive to changes in the applied load or crashes or maintenance elsewhere in the system. To ease this burden, some embodiments of the infrastructure monitor 16 are configured to automatically discover newly added hosts within a domain, for instance, new virtual machines that were added or new computing devices that were added. In some cases, the infrastructure monitor 16 may periodically, or in response to a command, scan a range of network addresses, like in a private subnet, with request sent according to various network management protocols, like Simple Network Management Protocol (SNMP), Secure Shell (SSH), Windows Management Instrumentation (WMI), or Internet Control Message Protocol (ICMP). If a computing device is not at a given address in the range, no response may be received within a threshold duration of time, and that address may be disregarded. In contrast, a new computing device or other host at a given address, upon receiving the network management protocol request may respond to the request, indicating the presence of a host. Upon detecting a new host, some embodiments of the infrastructure monitor 16 may direct the host to install an instance of the infrastructure agent and, in some cases, configure various probes thereon based upon a role indicated by the host.

In some embodiments, the infrastructure monitor 16 may receive information reported from the infrastructure agents and generate various dashboards, reports, and alarms based on this information. In some embodiments, the infrastructure monitor 16 is further configured to automatically take remedial action, for instance, provisioning additional computing devices responsive to thresholds being exceeded, like thresholds indicating CPU or memory usage greater than a threshold amount. In some embodiments, the infrastructure monitor 16 may organize the received information according to an identifier of a host upon which the infrastructure agent reporting the information is executing. Based upon discovered hosts, and in some cases information reported by those hosts, some embodiments of the infrastructure monitor 16 may construct a network-architecture topology of a physical architecture of computing devices within a domain. In some cases, this network-architecture topology may include network-architecture host identifiers for each of the hosts that were discovered or otherwise identified (for instance, manually identified and configured by a system administrator). In some cases, these host identifiers may be specified by a system administrator, or in some cases, the host itself.

In some embodiments, as discussed above, the monitoring software further includes application performance management software. For example, some embodiments may include a distributed application performance management application including the application monitor 18 and an application agent 32 (or plurality of application agents) executing on the computing devices 20 through 24. In some embodiments, the application agents may be configured to monitor performance of the application component 30. Monitoring performance may take a number of forms, and examples include measuring response times of various routines of the application component 30, for instance, durations of times elapsed between when a given routine is called and when the given routine returns a response. Other examples include gathering errors thrown by routines. In some embodiments, routines may be instrumented by adding calls to the application agent at the beginning and ends of the routines, such that the application agent receives a signal when a given routine in a given execution instance begins and ends, and the application agent may determine response times based on the signals by subtracting the time at which the begin signal was received from the time at which the end signal was received. In some embodiments, these routines may receive such signals from an operating system of a host. In some cases, the application agent and application component may be configured before both are installed on a computing device. For instance, code for the application component may be instrumented with calls to the application agent before that code is installed in a machine image or the computing device 20-24 that receives that machine image.

In some embodiments, the application agent 32 may gather attributes, metrics, and events of application components and report that gathered information to the application monitor 18, for instance, buffering the information and sending it periodically or sending the information responsive to queries. In some embodiments, the application monitor 18 may aggregate information gathered from a plurality of application agents executing on the computing devices 20 through 24 for a given distributed application and generate various dashboards, reports, and alarms. In some embodiments, the application monitor 18 may be configured to group reported metrics according to a given transaction serviced by the distributed application. For instance, a given website request and the chain of events in a pipeline by which the given website request is serviced is an example of a transaction. In many cases, the distributed application may service a relatively large number of transactions concurrently, for instance, after a relatively large number of users make requests at around the same time. Some embodiments may be configured to, for a given transaction, determine a total response time for the transaction, for instance, as perceived by a user, indicating a difference in time between when a request was received and when a response was provided for a user. Further, some embodiments may be configured to segment that response time for the transaction according to the contribution of each of the application components and routines therein. The various reports analyses, and dashboards described herein may be formed by instructing a computing device to render a graphical user interface depicting the same, for instance, by sending instructions to a web browser on a remote computing device or instructing a display of a computing device upon which the respective monitor 16 or 18 is executing. Thus, in some cases, a developer may be able to query the application monitor 18 for particularly slow transactions (or transactions for which an error occurred) and drill down into the particular application component and routine that contributed to the slow response or error.

In some embodiments, the alarm analyzer 12 includes an alarm scorer 34, a context data repository 36, a batch manager 38, a rules engine 40, and an alarm policies repository 42. In some embodiments, the alarm analyzer 12 may receive alarms or other events from the infrastructure monitor 16 or the application monitor 18. In some cases, these events may be emitted as events by one of the above-described agents, or in some cases, the events may be identified by one of the monitors 16 or 18 upon determining that a reported metric exceeds a threshold or has some state.

In some cases, the events may be received at a relatively high rate, for instance, exceeding 10 per second, and in many cases exceeding 100 or 1000 per second. In some embodiments, the alarm analyzer 12 may be a component of the infrastructure monitor 16 or the application monitor 18 or in some cases, the alarm analyzer 12 may be a distinct service to which these monitors 16 and 18 send alarms, for instance, in order to receive an alarm score or set of alarm scores in response. In some embodiments, each alarm may include an identifier of a computing device, host, or service to which the alarm pertains. Some embodiments may be configured to correlate and identified host or device identifier with a corresponding service based on information stored in the context data repository 36, indicating which services are run on which computing devices in which hosts. In some embodiments, the events may be timestamped, indicating when the event occurred. In some embodiments, events may be received as an asynchronous stream, or some embodiments may retrieve events as a batch. In some embodiments, events may include a category of event, for instance, indicating a software failure, hardware failure, slow down, available capacity exceeded, processor, memory, temperature, or network bandwidth threshold exceeded, or the like. In some embodiments, the events, such as an alarm, may also include a description, for instance, indicating a metric and value of the metric that precipitated the event.

In some embodiments, the alarm score 34 may be configured to assign an alarm score to a received alarm. In some embodiments, the alarm score indicates an estimated marginal effect of the phenomenon indicated by the alarm on the distributed application. For example, in some scenarios, a given alarm may be received when a computing load is relatively low, when available capacity is relatively high, and when network performance is relatively high. As a result, the marginal effect of the alarm may be relatively low, as the system may have capacity to compensate for the phenomenon indicated by the alarm. For instance, if one of five redundant web servers goes down, and the other four are well below their capacity, the alarm resulting from the failure may not be particularly concerning. In contrast, if four of the five web servers are over a threshold amount of processor capacity, the alarm may be more concerning, or if three of the five have already crashed, the alarm may be more concerning. In some embodiments, the alarm score may quantify the seriousness of the alarm in the context of the current state of the distributed application and the computing hardware upon which it operates.

In some embodiments, the current state of the computing hardware and performance of the distributed application may be indicated by context data in context data repository 36. In some embodiments, context data includes events, attributes, and metrics of other instances of a given service that emitted the alarm that was received. For instance, an application may include 25 different instances of a service that constructs a portion of a dynamic webpage, and the context data may indicate events, metrics, and attributes of those other services and the hosts in computing devices upon which they are executed. In some cases, the context data indicates whether a given instance of a given service is operational, a queue length of tasks to be processed by the given instance or a collection of instances, processor utilization, memory utilization, network utilization or the like of an instance of a service, response times of other instances of the service, or the like. In some embodiments, the context data includes data about other services, different from the services from which the alarm is received. For example, in some cases, a distributed application may be characterized as a pipeline of services, and some services may be upstream or downstream of a service that emits the alarm in some embodiments. In some cases, the context data includes the same type of information as discussed above for each of these services and each instance of the services in some cases. In some cases, the context data includes a number of other instances of a service that are available. In some cases, the context data includes historical patterns in computing load, for instance, patterns in amounts of transactions processed per unit time during a given hour, day, week, or month according to a previously detected pattern. In some embodiments, the context data may be indexed according to an identifier of service instances and attributes of the distributed application.

In some embodiments, the context data includes a logical architecture topology of the distributed application or a network-architecture topology of the distributed application. In some embodiments, the alarm score may access one or both these topologies to identify a redundant computing capacity that can accommodate an added load and access other context data indicating current usage to identify an amount of available capacity.

For example, some embodiments may identify each instance of a given service that includes a service for which an alarm is received based on one of these topologies. Some embodiments may then retrieve from the context data repository 36 events of the services indicating whether the services are operational and metrics of the service instances indicating amounts of computing resources used by the services. Some embodiments may also access the context data 36 to obtain attributes of the computing devices or hosts upon which the service instances are executing to determine amounts of unused capacity. Some embodiments may then calculate a weighted sum of the various parameters accessed or calculated based on the context data. In some cases, the resulting weighted sum may serve as an alarm score calculated by the alarm scorer 34.

In some embodiments, as discussed above, services may be nested in a service tree, and some embodiments of the alarm score 34 may calculate a different alarm score for each nested service. In some cases, different levels of the hierarchy of nested services may be more sensitive to a given alarm, for instance, having less backup capacity to accommodate the event indicated by the alarm.

In some embodiments, the alarm scorer 34 may calculate a score based on events, metrics, or attributes of other services or computing devices upon which other services execute within the distributed application, different from the service from which the alarm is received. For example, some applications may have a latency budget indicating a time in which transactions are to be processed, for instance, response times for a webpage with a goal of less than 400 milliseconds. Some embodiments may determine how much of that latency budget is currently being consumed or is estimated to be consumed by other portions of a pipeline of the distributed application through which the transactions are processed. In some embodiments, if upstream and downstream portions of that pipeline are operating relatively quickly, then a given alarm may not be particularly concerning. In contrast, if a given stage of that pipeline is also operating relatively slowly, then some embodiments may calculate a higher alarm score due to the lower remaining latency budget. Some embodiments may estimate based on the context data response times for each stage of such a pipeline (or where multiple services are operating concurrently, a longest response time) and compare a sum of response times to a transaction latency budget to determine a remaining portion of a latency budget. In some cases, the alarm score may be based on this remaining portion of the latency budget, for instance, a difference between an estimated response time of a given service from which alarm is received and the remaining portion of the latency budget. In some cases, the alarm score may tend to: increase as the remaining portion of latency budget decreases; increase as processor, memory, or network bandwidth utilization of other computing devices increase; increase as unused capacity decreases; and vice versa. Or in some cases, lower alarm scores may semantically indicate a more serious alarm, and these relationships may be reversed.

As mentioned, in some cases, alarms may be received at a relatively high rate. Accordingly, some embodiments may implement techniques to process alarms with lower latency at larger scales, for instance, with the batch manager 38. In some embodiments, the batch manager 38 may be configured to batch received alarms, for instance, into groups of a threshold amount or into groups received within a window of time. In some embodiments, context data pertaining to that batch may be loaded into program state, for instance, from the context data repository 36 for faster access. In some embodiments, the entire batch may be processed before emitting alarm scores, or alarm scores may be emitted as the respective alarms are processed. In some embodiments, alarms within the batch may be processed concurrently on different instances of the alarm scorer 34, for instance, executing on different computing devices or on different threads of a given computing device. In some embodiments, the alarm score 34 may be implemented with a real-time complex event processing system, like Apache Flink™ or Apache Storm™ to expedite processing.

In some embodiments, certain actions may be taken responsive to the alarm scores. For instance, the alarm scores may be received by the rules engine 40, and the rules engine 40 may retrieve alarm policies from the repository 42 to determine corrective or subsequent actions. In some cases, a subset of the alarm policies may be retrieved based on parameters of the alarms. In some cases, the alarm policies may include a plurality of rules that indicate if a given condition occurs, then certain actions are to be taken. In some cases, those actions may include sending a communication to an engineer, for instance, via an email or text message, the communication indicating the alarm that triggered the rule. In some cases, the rules specify that additional capacity is to be provisioned. For instance, in some cases, upon receiving an alarm from a given instance of a given (i.e., any particular one) service that exceeds a threshold with its alarm score, some embodiments may provision another instance of that given service to provide additional capacity. In other cases, for instance when a latency budget is exceeded, some embodiments may provision other instances of other services, different from an instance of a service from which an alarm is received. For instance, if upstream or downstream services are less expensive to provision or faster to provision, some embodiments may provision instances of those services to expedite operations. In some cases, provisioning additional services may include requesting additional virtual machines or computing devices to be added to an account in a public cloud system, downloading an image containing an operating system and code by which the service is implemented to the added virtual machine or computing device (or container), and starting the virtual machine or computing device. In some cases, the rules engine 40 may indicate that computing devices or virtual machines are to be removed from such an account, for instance, upon determining that excess capacity remains.

In some embodiments, a given service instance may be a component of multiple distributed applications, and in some cases the above operations may be performed for each of the different distributed applications, for instance, determining alarm scores for a plurality of services in different service trees in the different distributed applications, in some cases with different levels of hierarchy in the service trees in the different distributed applications.

Figure 3:
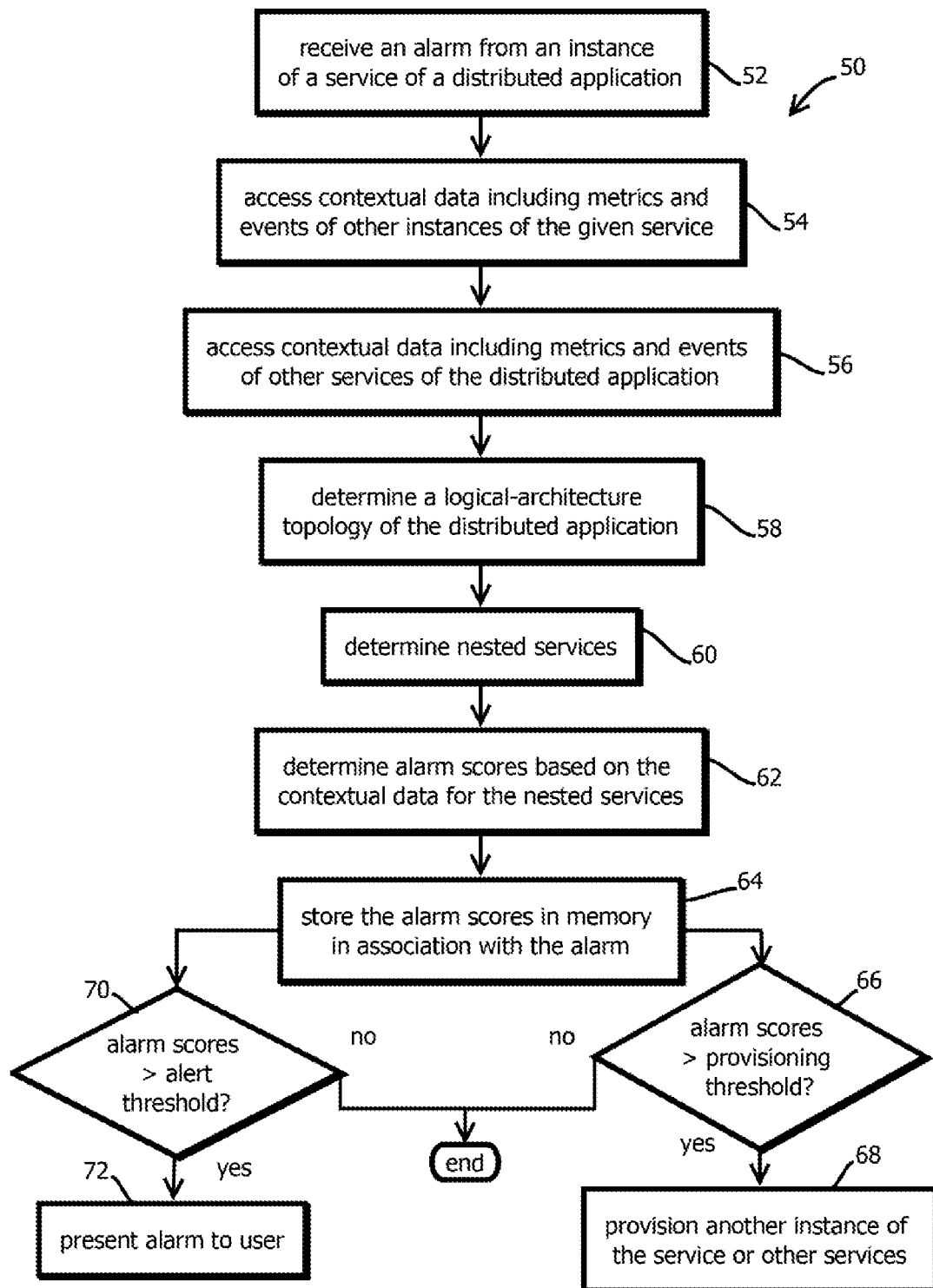
FIG. 3 is a flowchart of an example of a process to score alarms in accordance with embodiments of the present techniques.

FIG. 3 illustrates an example of a process 50 that may be implemented by the alarm analyzer 12 in some embodiments. In some cases, the process 50 (and other functionality herein) may be implemented on a tangible, non-transitory, computer-readable medium in the form of computer code that when processed by one or more computing devices effectuate the operations described. In some embodiments, the process 50 includes operations that may be executed in a different order from that indicated, includes operations that may be omitted in some cases, and includes operations that may be executed multiple times concurrently, none of which is to suggest that other features described herein are not also amenable to variation.

In some embodiments, the process 50 includes receiving an alarm from an instance of a service of a distributed application, as indicated by block 52. In some cases, the alarm may be received directly from the instance of the service, or in some cases, the alarm may be received from a monitoring server that aggregates events, metrics, and attribute reported by agents from a plurality of services or computing devices upon which the services execute.

Next, some embodiments may access contextual data including metrics and events of other instances of the given service, as indicated by block 54. In some cases, this may include accessing a logical-architecture topology or a network-architecture topology to identify identifiers of the instances of the services and the computing devices or hosts thereon. Some embodiments may then query the context data repository 36 with these identifiers to retrieve relevant contextual data, which may include information about other instances of the same service, as indicated by block 54. Some embodiments may also access contextual data including metrics and events of other services of the distributed application, as indicated by block 56. In some cases, the other services may each include a plurality of instances of the other services, and the other services may be upstream or downstream of the given service in a transaction pipeline of the distributed application. For instance, the transaction pipeline may include receiving a request from a client browser with a web server, sending that request to a load balancer, sending the request into a service that dynamically constructs an inventory of content items to be included in a webpage, sending the inventory of content items to a service that constructs a webpage that includes the content items, and then sending the content items in a dynamically constructed webpage back to a client computing device. These pipelines may take a variety of different forms, depending upon how fine-grained the service-architecture of a distributed application is and the type of distributed application.

Next, some embodiments may determine a logical-architecture topology of the distributed application, as indicated by block 58. In some cases, this may be performed in order to perform blocks 54 and 56 or as a separate operation. In some embodiments, this operation may also include determining a network-architecture topology of the distributed application, indicating the physical architecture underlying the services. In some cases, this may be determined in advance of receiving the alarm. Further, the contextual data may be received in advance of receiving the alarm, or in some cases, this information may be queried from relevant computing devices, hosts, or services upon receiving the alarm.

Some embodiments may determine nested services including the given service, as indicated by block 60, for instance, based on the logical architecture topology. Some embodiments may execute a depth-first (or breadth-first) recursive traversal of a service tree to identify lower-level nested services. Some embodiments may similarly follow links upward through the service tree to identify higher-level nested services. In some cases, the services may be associated in the context data or the topology with identifiers of instances of services and hosts or computing devices upon which the services are executed, which may be used to identify relevant contextual data.

Next, some embodiments may determine alarm scores based on the contextual data for the nested services, as indicated by block 62. In some cases, these alarm scores may be a weighted sum of a plurality of scores indicative of available capacity, for instance, computing capacity of other instances of the given service (or other services in the nested services), or capacity within a latency budget used by other services in a pipeline. In some cases, the alarm scores are based on both other instances of the given service and other services in a pipeline, for example, with a weighted sum of scores pertaining to each of these categories. Some embodiments store the alarm scores in memory in association with the alarm as indicative by block 64.

In some embodiments, weights may be determined empirically, for instance, by training a supervised machine learning model on a log of previous transactions and related events, metrics, and attributes. Some embodiments may iteratively execute a stochastic gradient descent by adjusting the weights in a direction that tends to decrease an amount of error between predictions by the current alarm scoring weights and the previously observed performance in different scenarios indicated by the logged events and transactions. In some cases, this process may be repeated iteratively until a termination condition occurs, for instance, an amount of change in the weights or result produced by the weights is less than a threshold amount between iterations or a threshold number of iterations have been performed. In some cases, a stochastic gradient descent training routine may be repeated multiple times with different randomly selected initial weights and a set of weights that produce a lowest amount of disagreement between historical observations and predictions based on alarm scores may be selected among each of these replications in order to guard against local minima arising from arbitrary choices of initial conditions. In some cases, some of the historical data may be held in reserve (i.e., not used in training), and the resulting set of weights may be cross-validated by processing the historical data to determine whether the alarm scores indicated when processing the historical data accurately predict logged deficiencies in application performance (e.g., transaction times exceeding a threshold, failed transactions, or the like). Or in some cases, the weights may be hand-tuned, for instance by an engineer.

Some embodiments may store the alarm scores in memory in association with the alarm, as indicated by block 54. In some cases, the alarm scores may be stored in program state for relatively fast access or committed to persistent memory.

Next, some embodiments may determine whether any of the alarm scores exceed a provisioning threshold, as indicated by block 66. In some cases, upon determining that the alarm scores do exceed a provisioning threshold, some embodiments may provision another instance of the service or another instance of other services, as indicated by block 68 and as discussed above. Some embodiments may also determine whether the alarm scores exceed an alert threshold, as indicated by block 70. Upon determining that at least one of the alarm scores exceeds an alert threshold, some embodiments may present an alarm to a user, as indicated by block 72. In some cases, this may include sending a text message or email message to a designated user. For instance, by accessing a schedule of users having maintenance responsibilities, identifying an address at which the user is reachable, and sending a message to that address. Or some embodiments may present the alert threshold on a report or dashboard. A computing device may be instructed to present the alarm through a variety of different techniques. In some cases, a computing device may be instructed present the alarm by sending a message over a network to another computing device that causes the other computing device to present the alarm (e.g., in a browser-based dashboard). Or in some cases, a computing device may be instructed present alarm by instructing a graphical processing unit of a computing device that makes determination 70 to present the alarm, without communicating instructions over a network.

Alternatively, upon a negative result of block 66 or 70, the process may end, and other alarms may be processed.

Some embodiments may address other related problems, either with the aid of the above techniques, or independently. As noted, various monitored entities emit various alarms (and other metrics), e.g., CPU usage threshold exceeded, latency threshold exceeded, buffer/queue size threshold exceeded, thrown software errors, etc. Assessing the seriousness of the marginal alarm for a given computing entity can be difficult. In some cases, an alarm signals the failure of an instance of hardware that is a bottleneck in a critical process and that requires manual replacement. In other cases, the alarm relates to virtual machine (or container or microkernel) for a non-critical monitoring service and can be replaced by spinning up a new instance automatically in seconds. Existing tools do not adequately distinguish these scenarios. This is particularly a problem in many modern systems that emit thousands of alarms per hour.

To mitigate these and other issues, some embodiments characterize (e.g., classify or score) the alarms based on how difficult or important it is to replace the computational entity that emitted (or otherwise caused) the alarm. Some embodiments characterize the entity that emitted an alarm by type of entity, e.g., field programmable gate array, a microkernel, a container, a virtual machine, a non-virtual computing device, etc. The alarm may be characterized based on this type and the task performed by the entity, and in some cases, the duration over which the alarm has been emitted. Depending on the characterization, various actions may be taken, e.g., day 1, send an SMS; day 2, log the alarm; and day 3 onward, deactivate the entity and spin up a new instance. Additional signals that may be used to characterize the alarm include administrator polices (in some cases, learned from previous behavior by IT staff), priority of device and task, environment type (e.g., development vs. production), and the like. Various responsive actions may be taken, including adjusting agent configurations (like changing what is monitored or thresholds), adjusting who is notified (e.g., according to a repository of roles in an organization), adjusting a parameter of the entity emitting the alarm, and killing the entity emitting the alarm.

Figure 4:
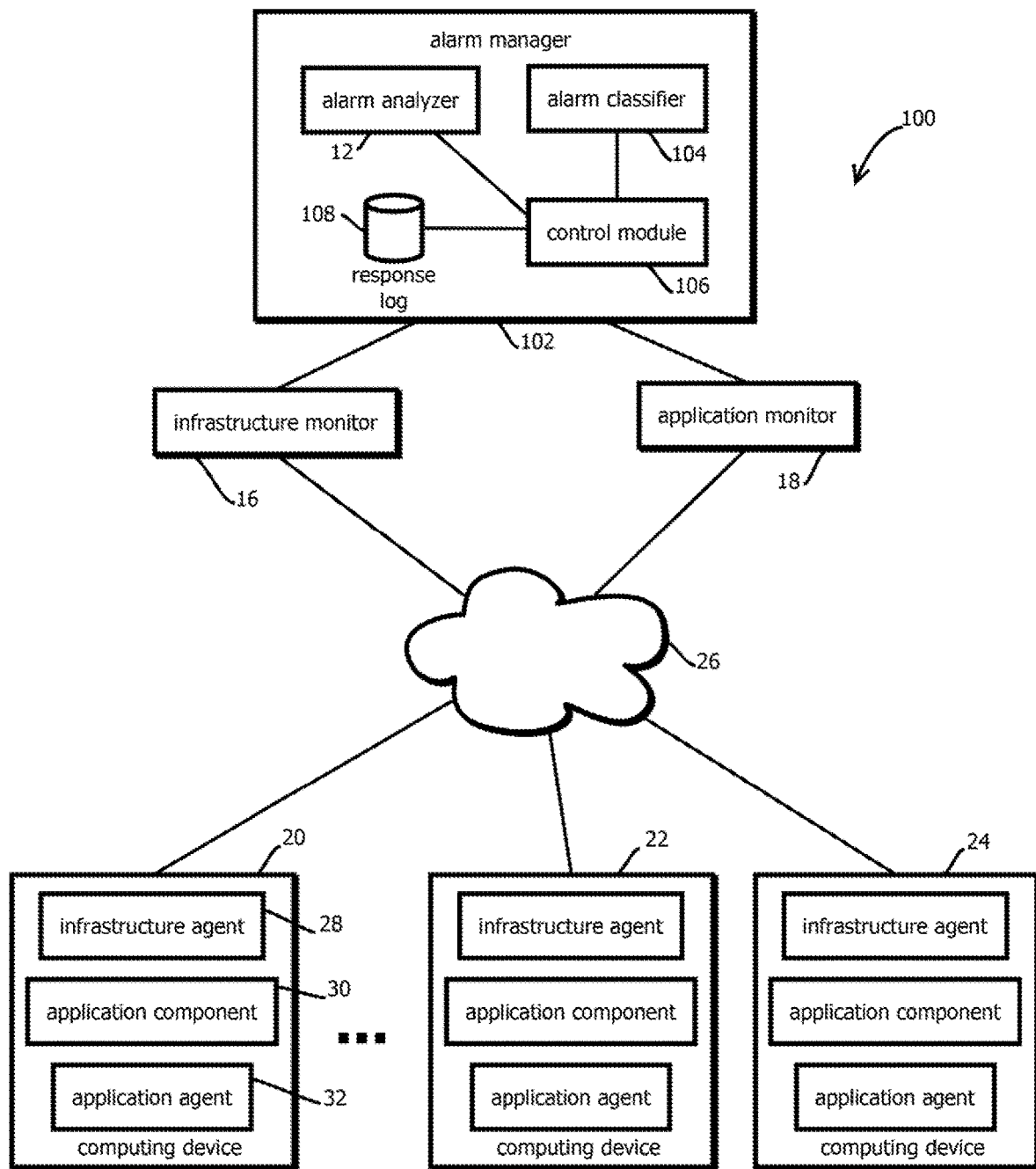
FIG. 4 is a block diagram of a computing environment having an alarm manager in accordance with embodiments of the present techniques.

In some embodiments, these and other techniques may be implemented in a computing environment 100 shown in FIG. 4. Some embodiments include an alarm manager 102 configured to classify alarms based on a variety of factors, such as based on a type of computational entity from which an alarm is received, and in some cases coordinate responsive action based on the classification. In some cases, the alarm manager 102 includes the alarm analyzer 12 described above, but embodiments are also consistent with systems that omit the alarm analyzer 12, which is not to imply that any other feature described herein may not also be omitted in some embodiments.

In some embodiments, the computing environment 100 includes the components described above, including the infrastructure monitor 16, the application monitor 18, computing devices 20, 22, and 24, and the network 26. In some cases, these components may communicate with one another and the alarm manager 102 to effectuate the functionality described herein. Two different types of monitoring applications are shown, the infrastructure monitor 16 and the application monitor 18 (along with their corresponding agents), but embodiments are consistent with other types of monitoring applications, including agentless monitoring applications. Some embodiments may include only one of these types of monitoring applications, or additional types of monitoring applications, which is not to suggest that any other feature described herein is not also amenable to variation.

In some embodiments, the alarm manager 102 includes an alarm classifier 104, a control module 106, the alarm analyzer 12, and a response log 108. In some embodiments, the control module 106 may coordinate the operation of the other components and direct responsive action upon classification of alarms, in some cases based on alarm scores, and in some cases with a supervised machine learning model trained based on historical responsive actions and events in the response log 108.

In some embodiments, the alarm classifier 104 may be configured to classify alarms or other events. In some cases, the number of alarms may be relatively large, and the alarms may arrive at a relatively high rate, for instance, more than 10 per second, and in some cases, more than 1000 per second. In some cases, the alarm manager 102 may interface with, and classify and otherwise process alarms from, a relatively large number of different computing environments are different sets of monitoring applications and monitored distributed applications, for instance, more than five, and in some cases more than 50 or more than 500, for example, in architectures in which the alarm manager is offered as a remote service, for instance, accessible via an application program interface, under a software-as-a-service distribution model. In some embodiments, the alarm manager 102 may be configured to process alarms relatively rapidly with a concurrent processing architecture implementing the alarm classifier 104. Examples include various complex event processing libraries and frameworks, including Apache Flink™, and Apache Storm™.

In some embodiments, alarms may be classified based on a type of computational entity emitting the alarm or metric upon which the alarm is based, for instance, serving as the sole cause of the alarm or one of several causes of the alarm. In some cases, a given computational entity may emit a value indicative of a metric, such as processor utilization, memory utilization, response time, or various other examples consistent with those described above, and a different computing device may compare that metric to a threshold or a value based on the metric to a threshold, and determine whether to emit an alarm. Or in some cases, the computational entity itself experiencing the phenomenon giving rise to the alarm may emit the alarm itself, for instance, by one of the above-described agents sending an alarm to one of the above-described infrastructure monitors 16 or 18.

In some cases, the alarm may be indicative of a deterioration in performance of the computational entity. Examples include a reduction in unused processing, memory, heat dissipation, network bandwidth, latency budget, error correction or detection budget, or other types of capacity, for instance, a reduction by greater than a threshold amount, a reduction to less than a threshold amount remaining, or a rate of change of one of these amounts exceeding a threshold. For example, the amount of time that a given routine of a given computational component takes to process a given task performed by that routine may exceed a threshold, for example due to some background process consuming other resources of the computing device, and some embodiments may detect this phenomenon and emit an alarm. In another example, a given virtual machine executing on the computing device may determine that an amount of available CPU capacity has dropped below a threshold and emit an alarm. Some embodiments may determine that an amount of packet loss on a network has exceeded a threshold and emit an alarm. In some cases, the deterioration of performance may take the form of a software error, for example, an error emitted by a given routine of a given application component, like a syntax error, a type error, a division by zero error, or the like. In some cases, software errors may include a stack trace indicative of a hierarchy of a call graph tracing from a given routine responsible for the error up through each routine that calls that routine or routine ultimately calling that routine, in some cases through more than five or ten other routines.

As noted, in some cases the alarm classifier 104 classifies alarms based on a type of computational entity. Some types of computational entities exhibit different recovery times when responsive action is taken. For example, in some cases, virtual machines may be easier and faster to provision than additional non-virtualized computing devices. Similarly, in some cases, new containers may be easier and faster to provision than a virtual machine or computing device. In some cases, new non-virtualized operating systems on computing devices may be faster to provision than new field programmable gate array instances having a particular configuration or new microkernels. Or in some cases, these relative provision times may be reversed, depending upon the specifics of an implementation, for instance, some virtual machines may be slower to provision than some field programmable code gate array instances.

In some embodiments, alarms may be emitted with an identifier of the computational entity or an identifier of a host by which the computational entity may be determined. For example, a given computing device may execute three different hosts, corresponding to three different network connections, and in some embodiments, the alarm may identify either the computing device, one of the three hosts, or combinations thereof. Some embodiments may access the above-described context data 36 of FIG. 2 to identify one or more computational entities corresponding to an alarm based on an identifier received with the alarm. In some cases, a given alarm may be associated with a hierarchy of computational entities, such as a computing device, a virtual machine running on the computing device, and a container running within the virtual machine. Some embodiments may classify an alarm with multiple classifications, each corresponding to one of these types of entities. Or some embodiments may select one of these computational entities in the hierarchy based on the alarm, such as a computational entity responsible for the alarm or suitable for addressing the alarm. For example, an alarm indicative of a deterioration of performance in a property that affects all software executing on a computing device, like a deterioration in temperature or unused system memory, may be assigned to a computational entity corresponding to a computing device, even though the alarm is emitted by a container executing on that computing device. In contrast, an alarm indicative of deterioration of performance in a property that primarily or only affects code executing within a more specific computational entity may be assigned to that more specific computational entity, e.g., an alarm arising from a software failure due to an attempt to invoke a library absent from the computing environment may be assigned to a container executing on a computing device, or an alarm arising from a paging error may be assigned to a virtual machine.

In some embodiments, the alarm may include a timestamp, an identifier of one or more computational entities (or these values may be added based on cross-referencing the context data 36 described above), and a description of the alarm. In some cases, the description includes an alarm type, for instance, indicative of a software alarm or hardware alarm, and in some cases an alarm code, like an alphanumeric code. In some cases, the alarm includes a stack trace, like that described above, and in some cases a description added to the alarm by the computational entity that emitted the alarm. In some cases, the alarm includes an identifier of an agent that emitted the alarm, such as one of several agents executing on a given (i.e., any particular one) computational entity.

Classification may take a variety of different forms. In some cases, an alarm may be explicitly designated as falling within one of a plurality of different predetermined categories. Examples include low, medium, and high priority categories, or delete, defer, and act categories. In some cases, the categories may be arranged in a hierarchical taxonomy, for instance, with delete, defer, and act subcategories underneath each of the low, medium, and high priority categories. Other examples include categorizing alarms by alarm type (e.g., administrative, configuration, exception), by type of entity to which the alarm pertains (storage, server, network device or network in general, to name a few, and which can be physical or logical in nature), by tenant (in a multi-tenancy environment, e.g., a service provider provides monitoring service for multiple customers/tenants; different tenants might have different service levels, for instance, gold, silver, bronze), by organization who has responsibility for managing categories of alarms (e.g., the recipients of notification or target of an action, who might have specific policies for handling alarms). In some instances, an alarm or an alerting condition is pertinent to (and determined based on) the presence or absence of a service, rather than more specifically on some level of service.

In some cases, the categorization may exclusively indicate a responsive action, or in some cases, the categorization may be an intermediate step to a process in which a responsive action is identified. For instance, responsive actions may be identified based on both the category and alarm score, as described below.

In some cases, categorization may include assigning a separate score from which a responsive action is determined. For instance, categorization may include scoring an alarm with a score ranging from 1 to 100, where other operations cause sub-ranges within that range to correspond to responsive actions, like values between zero and 20 resulting in deletion of the alarm, between 20 and 50 resulting in deferment of the alarm, and 50 to 100 resulting in re-instantiating an instance of a computational entity.

In some cases, categorization may occur in real time at the time the alarm is received, for instance, within 500 ms of receiving an alarm in order to take responsive action that does not substantially impair a user experience. Or in some cases, categorization may be delayed, for instance over a subsequent second, minute, hour, day, or month, or more (or less), for instance in cases in which categorization depends upon a sequence of alarms, like a determination that more than a threshold amount of a particular type of alarm from a particular computational entity is received within some threshold amount of time, like more than three alarms in a day.

In some embodiments, alarms may be categorized based on patterns in groups of alarms, for instance, an alarm may be categorized differently upon receiving a CPU, memory, and network bandwidth threshold alarm for each category within some threshold duration of time. Some embodiments may implement an alarm pattern recognition algorithm, for instance with a rules engine configured to match to patterns in collections of alarms. Or some embodiments may probabilistically classify alarms, for instance, with a Bayesian classifier that is updated based on the response log 108. Some embodiments may classify alarms with a neural network, for instance a recurrent neural network, like a long-short term memory (LSTM) recurrent neural network trained on the response log data 108. In some embodiments, the alarm classifier may classify alarms with a convolution LSTM recurrent neural network, for instance, based on one or more convolutions selected according to translation invariant aspects of the alarm stream, examples, including the entity emitting the alarm, the routine from which the alarm was emitted, and application component from which the alarm was emitted, a computing device from which the alarm was emitted, a transaction serviced by a routine from which the alarm was emitted, a feature of the distributed application that invokes the routine from which the alarm was emitted, or the like.

In some cases, the alarm classifier 104 may be trained on the response log data 108 to classify alarms with a variety of different approaches. In some cases, the response log data may be arranged as a labeled training set, which may be used to train a supervised machine learning model to classify alarms. For example, the response log may include a stream of time-stamped alarms, having the attributes described above, and the stream may be labeled with timestamped indicators of various objectives of the distributed application, for instance, timestamped indicators of uptime, response latency, failures, available excess capacity, or the like. Some embodiments may train the machine learning model to predict one or more of these various objectives based on the response log data and the timestamped labels. In some embodiments, the monitoring applications may insert the labels based on measured performance. In some cases, a client-side monitoring application, for instance with JavaScript in a webpage, or inserted in a native application, may report these indicators of various objectives, which may be added to the response log data.

In some embodiments, some or all of the weights or coefficients described of a neural network may be calculated by executing a machine learning algorithm on the above-described training set. Some embodiments may execute a gradient descent optimization to reduce the error rate and select appropriate weighting and the threshold values, such as those used in filtering. In some cases, a predictive model (e.g., a vector of weights) may be calculated as a batch process run periodically. Some embodiments may construct the model by, for example, assigning randomly selected weights; calculating an error amount with which the model describes the historical data and a rates of change in that error as a function of the weights in the model in the vicinity of the current weight (e.g., a derivative, or local slope); and incrementing the weights in a downward (or error reducing) direction. In some cases, these steps may be iteratively repeated until a change in error between iterations is less than a threshold amount, indicating at least a local minimum, if not a global minimum. To mitigate the risk of local minima, some embodiments may repeat the gradient descent optimization with multiple initial random values to confirm that iterations converge on a likely global minimum error. Other embodiments may iteratively adjust other machine learning models to reduce the error function, e.g., with a greedy algorithm that optimizes for the current iteration, e.g., as a decision tree. The resulting, trained model, e.g., a vector of weights or thresholds, may be stored in memory and later retrieved for application to new alarms.

Some embodiments may classify the alarms with other types of supervised machine learning models, for instance, hidden Markov model. Some embodiments may fit a translation probability matrix to the logged data, predict states likely to follow an alarm based on the matrix, and take responsive action based on the predictions. In such a model, the performance of an application may serve as the hidden state and the alarms may serve as observations. In some cases, each hidden state may be mapped to a corresponding responsive action. In some embodiments, the model may be trained with the Baum-Welch algorithm, and the likely performance may be inferred with the Viterbi algorithm. In some cases, other hidden state models may be used, such as a Kalman filter.

In some cases, a subset of the training set may be withheld in each of several iterations of training the model to cross validate the model. The model may be trained periodically, e.g., monthly, in advance of use of the model.

Thus, in some embodiments, the alarm classifier 104 may be hand tuned with rules or manually-configured parameters, or the alarm classifier 104 may be trained with a supervised machine learning model. In some embodiments, the model may be trained periodically, for example, daily, weekly, or monthly, based upon newly acquired data, and the model, once trained, may be used to classify alarms after training, for example more than one second, one hour, one day, or one week, after training.

In some embodiments, the control module 106 may be configured to take responsive action based upon classifications of alarms by the alarm classifier 104. To this end, the control module 106 may make various adjustments, such as an adjustment to a configuration of a monitoring application (e.g., the infrastructure monitoring application or the application performance monitoring application) or an adjustment to a network or logical architecture topology of the distributed application (e.g., adding new computational entities, terminating computational entities, adjusting load-balancing, or the like). The term "adjusting" includes sending an instruction to another computing device by which the adjustment is effectuated and does not require that an entity actually perform the adjustment itself to constitute adjusting.

For example, the alarm classifier 104 may classify an alarm as one in which the computational entity emitting the alarm is relatively rapidly replaced, for instance, an alarm from a container. Based upon this classification, the control module 106 may determine to terminate that particular computational entity and instantiate a new instance of the computational entity as a replacement, thereby addressing the condition leading to the alarm. In some cases, this determination may also be based upon an alarm score from the alarm analyzer 12, for instance a determination that the alarm is classified in a particular set of classes and that the alarm analyzer issued an alarm score greater than a threshold.

In another example, the alarm classifier 104 may classify an alarm as one in which the computational entity emitting the alarm is relatively slow to replace, for instance, an alarm from a field programmable gate array computing device. Based upon this classification, the control module 106 may determine to not terminate that particular computational entity or may determine to delay determination of that particular computational entity, for instance, until an overall load of the distributed application is lower, like during a nighttime slow down.

In some cases, the control module 106 may select a threshold for an alarm score based upon the classification. For instance, classifications indicating that a computational entity is relatively fast to replace may cause the control module 106 to select a relatively low threshold for an alarm score, while classifications indicating that a computational entity is relatively slow to replace may cause the control module 106 to select a relatively high threshold for alarm score. Upon exceeding the threshold, some embodiments may take any of the various responsive actions described herein.

In some cases, the control module 106 may select a threshold for a duration of time or frequency of an alarm based upon the classification. For example, some embodiments may select a relatively long duration of time over which an alarm persists before terminating a computational entity emitting an alarm having a classification indicating that the computational entity is relatively slow to replace and that the computational entity is not particularly high priority. In contrast, some embodiments may select a relatively short duration of time over which an alarm persists before terminating a computational entity emitting an alarm having a classification indicating that the computational entity is relatively fast to replace and that the computational entity is high-priority.

Adjustments may take any of a variety of different forms. In some cases, the adjustment is to a configuration of a monitoring application, such as an infrastructure monitor or an application performance monitor. Some embodiments may adjust a threshold by which alarms are triggered. For example, some embodiments may raise a threshold upon determining that an alarm is classified is not particularly high-priority or as having not persisted more than a threshold duration of time. In some embodiments, the adjusted threshold is within a centralized monitoring application instance that controls various agents, or in some cases, the adjustment is made to the various agents described above, in some cases with different adjustments being applied to different instances of the same agent on different computing devices. Or in some cases, the same adjustment may be broadcast to and made upon each of the agents on each of the computing devices executing the distributed application, or in some cases to agents monitoring a plurality of different distributed applications. In some embodiments, the adjustment is to stop gathering a particular metric or stop reporting alarms pertaining to a particular metric. In some embodiments, the adjustment is to start gathering a particular metric or start reporting alarms pertaining to a particular metric. In some embodiments, the adjustment is to measure or report a particular metric or set of metrics with an increased frequency or with the decreased frequency. In some embodiments, the adjustment is to change a presentation of information about the monitoring application. For example, in some embodiments, the adjustment is to change a role or identity of a technician to which a message describing the alarm is sent, or an account or communication channel by which the messages sent, for instance, changing from a text message to an email or vice versa. In some embodiments, the adjustment is to change a presentation within a dashboard or report, for instance to change a visual weight (e.g., color, size, icon, transparency, animated vibration, etc.) of an icon depicting a computational entity from which the alarm was emitted or to change a ranking of the computational entity or the alarm in a listing.

In some embodiments, the adjustment is made to a logical architecture topology of the distributed application. For example, some embodiments may add additional instances of a given application component, for instance, among a plurality of instances of the application component receiving tasks from a load balancer. In another example, some embodiments may terminate an instance of a given application component, for instance, one of several instances of the application component behind a load balancer. In some embodiments, the allocation of work load within the distributed application may be adjusted, for instance, by changing ranges of hash values mapped by a load balancer to particular instances of application components to shift workload away from an instance of an application component experiencing an alarm receiving a particular classification or to shift workload towards an instance of an application component.

In some embodiments, the network-architecture topology of the distributed application may be adjusted based on the classification. For example, some embodiments may add or terminate hosts executing application instances based on the classification. In another example, some embodiments may geographically redistribute such hosts executing application components, for instance, by decreasing a number of hosts executing an instance of an application component in one geographic region, like the western United States, and increasing a number of hosts executing instances of the application component in a different geographic region, like the eastern United States. Some embodiments may geographically reallocate application components based upon classifications of alarms indicating network problems, for instance between data centers, to increase the likelihood that each application component needed to service a given transaction is reachable via a network by users in different geographic locations. Some embodiments may add or remove computing devices, containers, virtual machines, microkernels, or field programmable gate arrays, or graphical processing units, to a physical architecture by which the distributed application is executed responsive to the classification.

In some embodiments, the adjustment is determined based upon rules processed by a rules engine of the control module 106. For example, rules describing the various determinations described above, e.g., a rule indicating that if a particular type of alarm persists for a first duration of time, then a threshold is raised, and if the particular type of alarm persists for a second, longer duration of time, then a message is emailed to a technician, and, if the alarm persists for a third, even longer duration of time, then the computational entity is terminated and a new instance is spun up. The different classification examples mentioned above may be implemented in various forms, in some cases each with its own range of control options, like threshold amounts, weightings, responsive actions, etc.

In some embodiments, the adjustment is determined based upon a trained machine learning model. In some embodiments, a consolidated supervised machine learning model may be trained based upon a global optimization that includes the machine learning model described above in the alarm classifier and a machine learning model that implements adjustments. Or in some cases, different models may be trained. In some embodiments, the training may be based upon historical data in the response log 108. In some embodiments, the response log may include a history of previous alarms and their classification, and in some cases alarm scores, and those alarms may be associated in the response log with responsive actions taken by technicians (or data indicating the lack thereof, like a null value). In some cases, the alarms may each be associated with a timestamp, and the responsive actions may similarly be timestamped and in some cases associated with alarms to which they pertain.

A variety of different types of machine learning models may be trained for the control module 106. Because of the temporal nature of alarms, some embodiments may implement the same set of candidate machine learning models described above for the alarm classifier, including recurrent neural networks, like LSTM models. Other examples include hidden Markov models or Kalman filters, which may be trained as well to predict the responsive actions that a skilled technician would be likely to choose following a particular alarm or sequence of alarms. In some embodiments, the underlying problem or deterioration in performance (e.g., transaction response time or error rate) may serve the role of latent variable.

In some embodiments, the machine learning model may include a plurality of parameters, like weights in a neural network, and some embodiments may adjust these parameters through an iterative process based on the historical response log data 108. For example, some embodiments may randomly or otherwise arbitrarily initialized the parameters; determine based upon alarms in the response log responsive action indicated by the model given the current parameters; compare those responsive actions to the responsive actions actually taken by a technician in the response log data; and calculate an aggregate measure of error or fitness based upon the comparison; for instance, a binary value indicating a match or failure to match, or a value between zero and one indicating a percentage of responsive actions taken in the response log and identified by the current instance of the model parameters (or a value between −1 and 1 that accounts for actions indicated by the current parameters that were not taken in the response log). Some embodiments may select a subsequent set of parameters based upon a partial derivative of the fitness or error function, choosing parameters with an adjustment in a direction that a partial derivative of the respective parameter with respect to the error or fitness function indicates an improvement to the model (e.g. decreasing error or increasing fitness). Some embodiments may repeat this process iteratively, improving fitness or decreasing error in the aggregate, until a termination condition occurs. Examples of termination conditions include determining that a threshold amount of repetitions have occurred or that a change in error or fitness between repetitions is less than a threshold, indicating a minimum or maximum. In some cases, some models may be susceptible to local minimums or maximums. To mitigate this risk some embodiments may repeat the above-described training algorithm with different, for instance randomly selected, initial conditions, and select a set of parameters produced by an instance of training that produces the lowest minimum or the highest maximum measure of error or fitness respectively. Some embodiments may also cross-validate the trained model, for instance, by holding in reserve a subset of the data in the response log, and determining the same measure of fitness or error on the data held in reserve with the trained model. Some embodiments may determine whether the resulting measure of fitness or error satisfies a threshold before permitting the model to be used. In some cases, the error or fitness function may be non-differentiable, in which case other types of models may be used, for example a Bayesian optimization.

In some embodiments, the training set may be relatively small, in which case techniques to extract greater value from the training set may be used, including bootstrap aggregation. In some embodiments, control options for various rules may be determined with various approaches: control options may be fully or partially determined algorithmically; control options may be based partially or fully on empirical data; or control options may be partially or fully specified either by the provider of the monitoring system (e.g., pre-determined rules that a monitoring application developer provides) or customized or synthesized by the technical staff of the entity operating the monitored application.

Once the machine learning model for the control module 106 is trained, for instance as part of a batch process performed daily, monthly, or yearly, the trained machine learning model may be used to determine responsive adjustments based upon classified, scored alarms. As noted above, in some cases, the adjustments may be determined at runtime, when the alarm is received, or some duration thereafter, in some cases.

Or some embodiments may execute a rules engine that selects responsive action based on hand-coded rules. For instance, some embodiments may apply a current stream of alarms to a set of more than 10, more than 100, or more than 1000 different rules, and take responsive action for each rule that is determined to apply. In some cases, the rules may branch to other rules in a hierarchy of rules, like in a decision tree (in the non-machine learning sense). These rules may take the form of any of the example responsive actions described herein. In some cases, the rules may be stored in a rule repository and adjusted from time to time.

Figure 5:
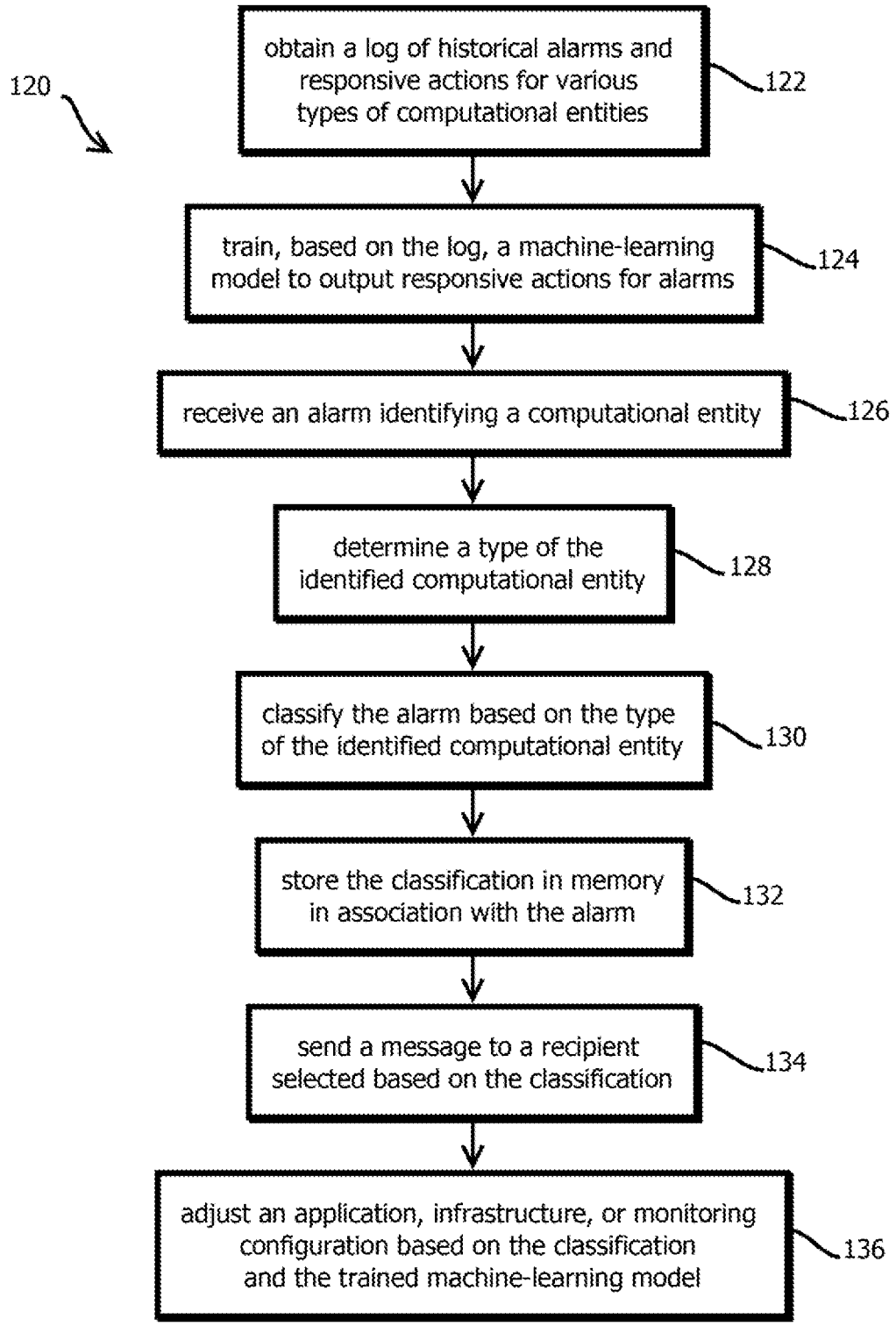
FIG. 5 is a flowchart of an example of a process to manage alarms in accordance with embodiments of the present techniques.

FIG. 5 shows an example of a process 120 that may be performed by some embodiments of the alarm analyzer 102 described above, but is not limited to those implementations, which is not to suggest that any other feature described herein is not also amenable to variation. In some embodiments, the process 120 includes obtaining a log of historical alarms and responsive actions for various types of computational entities, as indicated by block 122. Next, some embodiments may train, based on the log, a machine-learning model to output responsive actions for alarms, as indicated by block 124. In some cases, these two operations may be performed by the response log 108 and the control module 106, respectively, described above.

Next, some embodiments may receive an alarm identifying a computational entity, as indicated by block 126. In some cases, this operation may be performed some time after the operations of blocks 122 and 124, for instance, more than a day, week, or month later. In some cases, the received alarm may have the attributes of alarms described above.

Next, some embodiments may determine a type of identify computational entity, as indicated by block 128. In some embodiments, the type is a type of hardware, type of operating system, or type of virtual operating system. In some embodiments, the type is one selected from a list including a container, a virtual machine, a non-virtualized computer (e.g. a computer executing an operating system, which may or may not be executing a virtual machine within that operating system, but the alarm pertains to the non-virtualized operating system outside of any virtual machines executing within that operating system), a microkernel, a graphical processing unit, or a field-programmable gate array.

Next, some embodiments may classify the alarm based on the type of identified computational entity, as indicated by block 130, and store the classification in memory in association with the alarm, as indicated by block 132. In some cases, storing the classification includes storing the classification in program state, or in some cases, the classification may also be committed to persistent storage, for instance, on a solid-state drive.

Next, some embodiments may send a message to a recipient selected based upon the classification, as indicated by block 134. In some cases, the message may be a text message or an email message sent to a particular technician having a particular role selected based upon the classification. In some cases, an address to receive the message may be selected based upon each of the classification, a role in an organization, a record indicating a technician filling that role during a current time of day and day of week, and a record indicating an address (e.g. email or telephone number) of that technician filling that role.

Some embodiments may also adjust an application, infrastructure, or monitoring configuration based upon the classification and the trained-machine-learning model (or rules engine), as indicated by block 136. In some embodiments, this adjustment may include any of the various types of adjustments described above. Thus, some embodiments may receive alarms at a relatively high rate from relatively large, complex distributed applications, and determine classifications for those alarms, route relevant alarms to the appropriate recipients, and in some cases automatically determine adjustments, for instance, within less than five minutes, less than one minute, or less than 500 ms, of receiving the alarm.

Figure 6:
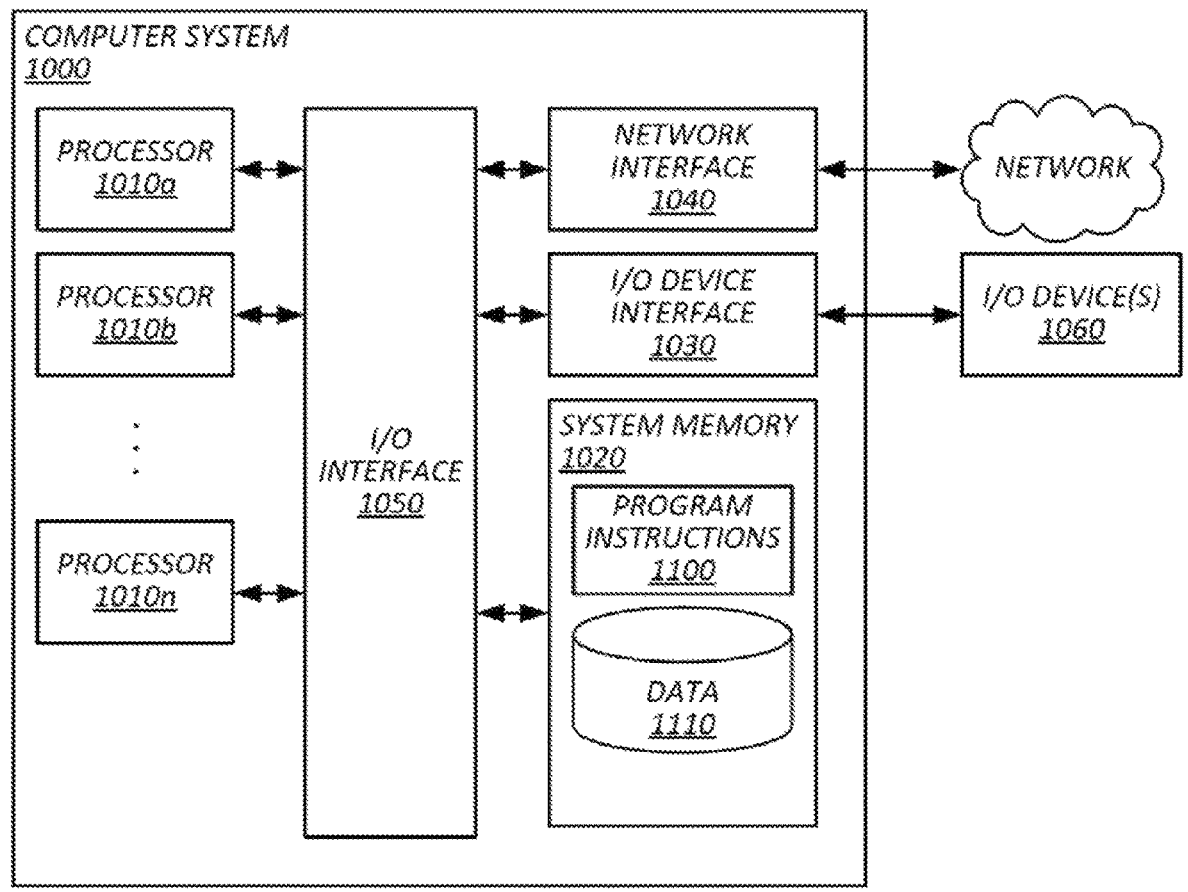
FIG. 6 is an example of a computing device by which the above techniques may be implemented.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the techniques. It is to be understood that the forms of the techniques shown and described herein are to be taken as examples of embodiments. Elements and materials may be substituted for those illustrated and described herein, parts and processes may be reversed or omitted, and certain features of the techniques may be utilized independently, all as would be apparent to one skilled in the art after having the benefit of this description of the techniques. Changes may be made in the elements described herein without departing from the spirit and scope of the techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method of estimating a marginal effect of an alarm from one computing device upon one or more distributed applications executing on a plurality of computing devices including the one computing device, the method comprising: receiving a given alarm from a given instance of a given service executing on a given computing device, wherein: the given service is one of a plurality of different services that form at least part of a given distributed application, and the distributed application is executing on a plurality of different computing devices including the given computing device; accessing contextual data, the contextual data including metrics or events received from other instances of the given service or other services of the given distributed application; determining an alarm score for the given alarm based on the contextual data, the alarm score being indicative of a marginal effect of the given alarm on performance of the given distributed application; and storing the alarm score in memory in association with the given alarm.
2. The method of embodiment 1, wherein: the given instance of the given service is one of a plurality of concurrently executed instances of the given service; the contextual data includes metrics or events of other instances of the given service; and determining the alarm score comprises determining an alarm score indicative of an amount of reserve capacity for the given service indicated by the metrics or events of other instances of the given service.
3. The method of embodiment 2, wherein: determining the alarm score comprises determining a number of concurrently executed instances of the given service based on events in the contextual data indicating the concurrently executed instances of the given service are operational.
4. The method of any one of embodiments 2-3, wherein: determining the alarm score comprises determining an amount of unused capacity in each concurrently executed instance of the given service based on metrics in the contextual data.
5. The method of any one of embodiments 2-4, wherein: determining the alarm score comprises determining unused capacity among the concurrently executed instances of the given service based on processor utilization, memory utilization, and network bandwidth utilization among metrics of the contextual data.
6. The method of any one of embodiments 2-5, wherein: determining the alarm score comprises determining an amount of tasks in a queue serviced by the plurality of concurrently executed instances of the given service.
7. The method of any one of embodiments 1-6, wherein: the contextual data includes metrics or events of other services in the distributed application; and the alarm score is based on a measured or estimated response time of at least one other service that precedes or follows the given service in servicing a transaction with the distributed application.
8. The method of embodiment 7, wherein: the alarm score is based on a measured or estimated cumulative response time for one or more transactions serviced by the distributed application, each of the one or more transaction being serviced with at least a plurality of the different services.
9. The method of embodiment 8, wherein: the alarm score is based on a difference between the measured or estimated cumulative response time and a response time budget.
10. The method of any one of embodiments 1-9, comprising: determining a plurality of alarm scores for the given alarm for each of a plurality of nested services based on the contextual data.
11. The method of any one of embodiments 1-10, comprising, based on the alarm score: instructing a computing device to indicate the given alarm with a user interface; or sending a message to an email or text-message account.
12. The method of any one of embodiments 1-11, comprising, based on the alarm score: determining to provision another instance of the given service.
13. The method of any one of embodiments 1-12, comprising, based on the alarm score: determining to provision another instance of a service different from the given service among the plurality of different services.
14. The method of any one of embodiments 1-13, wherein: the given distributed application is one of a plurality of different distributed applications each including at least some of the same instances of the plurality of different services; the give distributed application has a service-oriented architecture; the services include microservices that do not share program state with one another in an address space of a single instance of an operating system; the alarm score is based on the presence or absence of the given service or another service; based on the alarm score, an address is selected from a policy indicating recipients for various types of alarms and a message is sent to the address; and the services communicate with one another via respective network addresses.
15. The method of any one of embodiments 1-14, wherein: the given alarm is one of a plurality of alarms received at a rate exceeding 100 per second; the plurality of alarms are batched and the alarm score is determined as one of a plurality of alarm scores for alarms in a batch including the given alarm; the batched alarms are processed concurrently with multiple threads; and the context data is held in program state when processing each alarm in the batch including the given alarm.
16. The method of any one of embodiments 1-15, comprising: steps for monitoring infrastructure; and steps for monitoring application performance, wherein determining the alarm score comprises steps for determining an alarm score.
17. A tangible, non-transitory, machine-readable medium storing instructions that when executed by a data processing apparatus cause the data processing apparatus to perform operations comprising: the operations of any of embodiments 1-16.
18. A system, comprising: one or more processors; and memory storing instructions that when executed by the processors cause the processors to effectuate operations comprising: the operations of any of embodiments 1-16.

What is claimed is:
1. A method of estimating a marginal effect of an alarm from one computing device upon one or more distributed applications executing on a plurality of computing devices including the one computing device, the method comprising:
receiving a given alarm from a given instance of a given service executing on a given computing device, wherein:
the given service is one of a plurality of different services that form at least part of a given distributed application,
the services include microservices that do not share program state with one another in an address space of a single instance of an operating system,
the distributed application is executing on a plurality of different computing devices including the given computing device,
the given distributed application is one of a plurality of different distributed applications each including at least some of the same instances of the plurality of different services, and
the given distributed application has a service-oriented architecture;
accessing contextual data, the contextual data including metrics or events received from other instances of the given service or other services of the given distributed application;
determining an alarm score for the given alarm based on the contextual data, the alarm score being indicative of a marginal effect of the given alarm on performance of the given distributed application, wherein:
the alarm score is based on the presence or absence of the given service or another service;
based on the alarm score, an address is selected from a policy indicating recipients for various types of alarms and a message is sent to the address; and
the services communicate with one another via respective network addresses; and
storing the alarm score in memory in association with the given alarm.
2. The method of claim 1, wherein:
the given instance of the given service is one of a plurality of concurrently executed instances of the given service;
the contextual data includes metrics or events of other instances of the given service; and
determining the alarm score comprises determining an alarm score indicative of an amount of reserve capacity for the given service indicated by the metrics or events of other instances of the given service.
3. The method of claim 2, wherein:
determining the alarm score comprises determining a number of concurrently executed instances of the given service based on events in the contextual data indicating the concurrently executed instances of the given service are operational.
4. The method of claim 2, wherein:
determining the alarm score comprises determining an amount of unused capacity in each concurrently executed instance of the given service based on metrics in the contextual data.

5. The method of claim 2; wherein:
determining the alarm score comprises determining unused capacity among the concurrently executed instances of the given service based on processor utilization, memory utilization, and network bandwidth utilization among metrics of the contextual data.

6. The method of claim 2, wherein:
determining the alarm score comprises determining an amount of tasks in a queue serviced by the plurality of concurrently executed instances of the given service.

7. The method of claim 1, wherein:
the contextual data includes metrics or events of other services in the distributed application; and
the alarm score is based on a measured or estimated response time of at least one other service that precedes or follows the given service in servicing a transaction with the distributed application.

8. The method of claim 7, wherein:
the alarm score is based on a measured or estimated cumulative response time for one or more transactions serviced by the distributed application, each of the one or more transaction being serviced with at least a plurality of the different services.

9. The method of claim 8, wherein:
the alarm score is based on a difference between the measured or estimated cumulative response time and a response time budget.

10. The method of claim 1, comprising:
determining a plurality of alarm scores for the given alarm for each of a plurality of nested services based on the contextual data.

11. The method of claim 1, comprising, based on the alarm score:
instructing a computing device to indicate the given alarm with a user interface; or
sending a message to an email or text-message account.

12. The method of claim 1, comprising, based on the alarm score:
determining to provision another instance of the given service.

13. The method of claim 1, comprising, based on the alarm score:
determining to provision another instance of a service different from the given service among the plurality of different services.

14. The method of claim 1, wherein:
the given alarm is one of a plurality of alarms received at a rate exceeding 100 per second;
the plurality of alarms are batched and the alarm score is determined as one of a plurality of alarm scores for alarms in a batch including the given alarm;
the batched alarms are processed concurrently with multiple threads; and
the context data is held in program state when processing each alarm in the batch including the given alarm.

15. The method of claim 1, comprising:
steps for monitoring infrastructure; and
steps for monitoring application performance, wherein determining the alarm score comprises steps for determining an alarm score.

16. A tangible, non-transitory, machine-readable medium storing instructions that when executed by one or more computers effectuate operations comprising:
receiving a given alarm from a given instance of a given service executing on a given computing device, wherein:
the given service is one of a plurality of different services that form at least part of a given distributed application,
the services include microservices that do not share program state with one another in an address space of a single instance of an operating system,
the distributed application is executing on a plurality of different computing devices including the given computing device
the given distributed application is one of a plurality of different distributed applications each including at least some of the same instances of the plurality of different services, and
the given distributed application has a service-oriented architecture;
accessing contextual data, the contextual data including metrics or events received from other instances of the given service or other services of the given distributed application;
determining an alarm score for the given alarm based on the contextual data, the alarm score being indicative of a marginal effect of the given alarm on the given distributed application, wherein:
the alarm score is based on the presence or absence of the given service or another service;
based on the alarm score, an address is selected from a policy indicating recipients for various types of alarms and a message is sent to the address; and
the services communicate with one another via respective network addresses; and
storing the alarm score in memory in association with the given alarm.

17. The medium of claim 16, wherein:
the given instance of the given service is one of a plurality of concurrently executed instances of the given service;
the contextual data includes metrics or events of other instances of the given service; and
determining the alarm score comprises determining an alarm score indicative of an amount of reserve capacity for the given service indicated by the metrics or events of other instances of the given service.

18. The medium of claim 16, wherein:
the contextual data includes metrics or events of other services in the distributed application; and
the alarm score is based on a measured or estimated response time of at least one other service that precedes or follows the given service in servicing a transaction with the distributed application.

19. The medium of claim 18, wherein:
the alarm score is based on a measured or estimated cumulative response time for one or more transactions serviced by the distributed application, each of the one or more transaction being serviced with at least a plurality of the different services.

20. A tangible, non-transitory, machine-readable medium storing instructions that when executed by one or more computers effectuate operations comprising:
receiving a given alarm from a given instance of a given service executing on a given computing device, wherein:
the given service is one of a plurality of different services that form at least part of a given distributed application, and
the distributed application is executing on a plurality of different computing devices including the given computing device;

accessing contextual data, the contextual data including metrics or events received from other instances of the given service or other services of the given distributed application;

determining an alarm score for the given alarm based on the contextual data, the alarm score being indicative of a marginal effect of the given alarm on the given distributed application, wherein:

the given alarm is one of a plurality of alarms received at a rate exceeding 100 per second;

the plurality of alarms are batched and the alarm score is determined as one of a plurality of alarm scores for alarms in a batch including the given alarm;

the batched alarms are processed concurrently with multiple threads; and the context data is held in program state when processing each alarm in the batch including the given alarm; and storing the alarm score in memory in association with the given alarm.

* * * * *